US006516658B1

(12) United States Patent

McCoy et al.

(10) Patent No.: US 6,516,658 B1

(45) Date of Patent: Feb. 11, 2003

(54) IDENTIFICATION OF DIESEL ENGINE INJECTOR CHARACTERISTICS

(75) Inventors: John C. McCoy, Fayetteville, TN (US); Lou Vierling, East Detroit, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/536,365

(22) Filed: Mar. 27, 2000

Related U.S. Application Data

(60) Provisional application No. 60/129,808, filed on Apr. 16, 1999, and provisional application No. 60/162,834, filed on Nov. 1, 1999.

(51) Int. Cl.[7] .............................................. G01M 15/00

(52) U.S. Cl. .................................................... 73/119 A

(58) Field of Search ............................... 73/116, 117.2, 73/117.3, 118.1, 119 A, 119 R; 701/101, 102, 103, 104

(56) References Cited

U.S. PATENT DOCUMENTS

| | | | | |
|---|---|---|---|---|
| 3,575,145 | A | | 4/1971 | Steiger |
| 3,786,344 | A | * | 1/1974 | Davis et al. |
| 3,942,485 | A | | 3/1976 | Suda et al. |
| 3,971,348 | A | | 7/1976 | Scofield |
| 4,181,944 | A | | 1/1980 | Yamauchi et al. |
| 4,190,022 | A | | 2/1980 | Long |
| 4,292,841 | A | | 10/1981 | Wesley |
| 4,313,412 | A | | 2/1982 | Hosaka et al. |
| 4,350,132 | A | | 9/1982 | Harsch et al. |
| 4,391,253 | A | | 7/1983 | Ito |
| RE31,391 | E | * | 9/1983 | Davis et al. |
| 4,402,294 | A | | 9/1983 | McHugh et al. |
| 4,416,237 | A | | 11/1983 | Aoki et al. |
| 4,469,074 | A | | 9/1984 | Takao et al. |
| 4,618,908 | A | | 10/1986 | Anttila |
| 4,656,989 | A | | 4/1987 | Yakuwa |
| 4,864,457 | A | | 9/1989 | Christian et al. |
| 4,905,120 | A | | 2/1990 | Grembowicz et al. |
| 4,972,293 | A | | 11/1990 | Verner |
| 4,972,996 | A | * | 11/1990 | Cerny |
| 4,975,848 | A | | 12/1990 | Abe |
| 5,044,563 | A | | 9/1991 | Mesenich |
| 5,049,879 | A | | 9/1991 | Symonds |
| 5,235,954 | A | * | 8/1993 | Sverdlin |
| 5,454,259 | A | | 10/1995 | Ishii |
| 5,535,620 | A | | 7/1996 | Nichols |
| 5,535,621 | A | | 7/1996 | Glidewell |
| 5,575,264 | A | | 11/1996 | Barron |
| 5,712,424 | A | | 1/1998 | Reed |
| 5,720,261 | A | * | 2/1998 | Sturman et al. |
| 5,721,375 | A | | 2/1998 | Bidner |
| 5,829,460 | A | * | 11/1998 | Acevedo |
| 5,954,030 | A | * | 9/1999 | Sturman et al. |
| 6,036,120 | A | * | 3/2000 | Varble et al. |
| 6,065,684 | A | * | 5/2000 | Varble et al. |
| 6,112,720 | A | | 9/2000 | Matta |
| 6,120,005 | A | * | 9/2000 | Wright |

FOREIGN PATENT DOCUMENTS

| | | |
|---|---|---|
| EP | 0195194 A2 | 1/1986 |
| EP | 0492876 A1 | 1/1992 |

OTHER PUBLICATIONS

International Search Report—Jul. 24, 2000.

* cited by examiner

*Primary Examiner*—Eric S. McCall

(57) ABSTRACT

A method for identifying particular characteristics of a fuel injection system places a characterization resistor into a power circuit for each fuel injector. The resistance is selected once the characteristics of the fuel injector have been tested after assembly. The control for the fuel injector is able to query the particular fuel injector and determine its characteristics based upon a voltage which has been influenced by the characterization resistance. In another feature of this invention, coded information, such as the characterization resistance, is assigned to a number of possible combinations of characteristics in a spiral fashion if the characteristics were stored in a two dimensional array.

20 Claims, 6 Drawing Sheets

Charectraization Resistances

| R ideal kohms | Closest standard kohms | Char # |
|---|---|---|
| 2.863 | 2.87 | 1 |
| 3.516 | 3.48 | 2 |
| 4.351 | 4.32 | 3 |
| 5.440 | 5.49 | 4 |
| 6.885 | 6.81 | 5 |
| 8.865 | 8.87 | 6 |
| 11.698 | 11.8 | 7 |
| 16.003 | 15.8 | 8 |
| 23.150 | 23.2 | 9 |

IDENTIFICATION OF DIESEL ENGINE INJECTOR CHARACTERISTICS

This application claims priority to Provisional Patent Applications Serial Nos. 60/129,808, filed Apr. 16, 1999 and 60/162,834 filed Nov. 1, 1999.

BACKGROUND OF THE INVENTION

The present invention relates to a method and apparatus for incorporating an identifying resistance into a fuel injector to provide an indication of characteristics of the particular injector .

Fuel injectors are utilized to assist in the injection of fuel during operation of a diesel engine. With manufacturing tolerances, etc., each fuel injector has distinct characteristics. Fuel injectors have two characteristics that a re important to control of the fuel injection process. First, an offset characteristic is defied, and second, a slope of change of the fuel injection ability is defined. As these two characteristics vary, an optimum control for the particular fuel injector also varies. Thus, an optimum control would be aware of the characteristics for a particular injector.

An OEM customer of applicant's has proposed that each fuel injector be tested to determine both the offset and slope, an d that an identifier be put into the fuel injector to tell an engine control the offset and slope which applies for the particular injector. The OEM proposed having a dedicated control, such as a microprocessor, incorporated into the fuel injector to send an identifying signal.

The present invention is directed to achieving the identification with a much simpler and lower cost solution.

SUMMARY OF THE INVENTION

In a disclosed embodiment of this invention, a fuel injector is tested after assembly, and its offset and slope determined. The offset and slope information is then used to characterize the fuel injection into one of several particular types. A characterization resistor of a value indicative of the "type" of injector is then incorporated into a circuit associated with the fuel injector. The diesel engine control can query the fuel injector, and read the voltage due to the characterization resistor to determine the "type" of fuel injector. The "type" is then associated with a particular offset and slope for the fuel injector. The control will then know how to optimally control the particular fuel injector.

In a preferred embodiment of this invention, the fuel injector is provided a coil to open the injector, and a separate coil to close the injector. Each coil is provided with a high side and a low side driver which are powered to operate the coils in normal operation.

As the engine is being started, the system automatically scans the characterization resistor of each injector to determine each cylinder's injector "type". Identification current is passed through the characterization resistor, which is connected to the high side of coil A and the low side of coil B. By applying the "48 V" power to a resistor network and returning the current to ground via the low side driver. T he voltage across the characterization resistor is measured at the high side of coil A . This voltage is then associated with a prestored code, which in turn tells the control which type of fuel injector is associated with the particular voltage. The present invention thus provides a simple way of identifying each fuel injector type. One particular benefit of this invention is that the wire harness to the fuel injector need not have any additional wire to provide the identification feature.

A control method is also disclosed wherein the identification of the particular fuel injector is only performed if the temperature of the control module is below a predetermined temperature. Applicant recognizes that if the control module is above a relatively high predetermined temperature, then the vehicle has not been stopped for any length of time. The need to redetermine each fuel injector type only occurs when a fuel injector has been replaced. The replacement of a fuel injector would require a long shutdown time for the engine. If the temperature of the control is above the predetermined temperature, an assumption can be made that the vehicle has not been shut down long enough to replace a fuel injector.

However, if the control temperature is below the predetermined temperature, then it is possible a fuel injector has been replaced. Of course, it may also simply be the vehicle has been shut down for a length of time, but no fuel injectors have been replaced. Even so, in a preferred method, in such a situation, each of the fuel injectors are again queried. A control signal is sent to each of the fuel injectors, and the voltage from the characterization resistor is read. The voltage is again associated with a particular type of fuel injector, and the particular type of fuel injector is stored at the control. The control then knows how to optimally operate the particular fuel injector.

A second distinct feature of this invention relates to the types of characteristics associated with an identifying quantity which increases. The increasing quantities increase such that each next voltage is assigned to a combination of the two characteristics that only changes in one of the two characteristics. This will be explained with reference to a two-dimensional array, where the "types" are stored in a spiral fashion.

These and other features of the present invention can be best understood from the following specification and drawings, the following of which is a brief description.

DETAILED DESCRIPTION OF A PREFERRED EMBODIMENT

Figure 1:
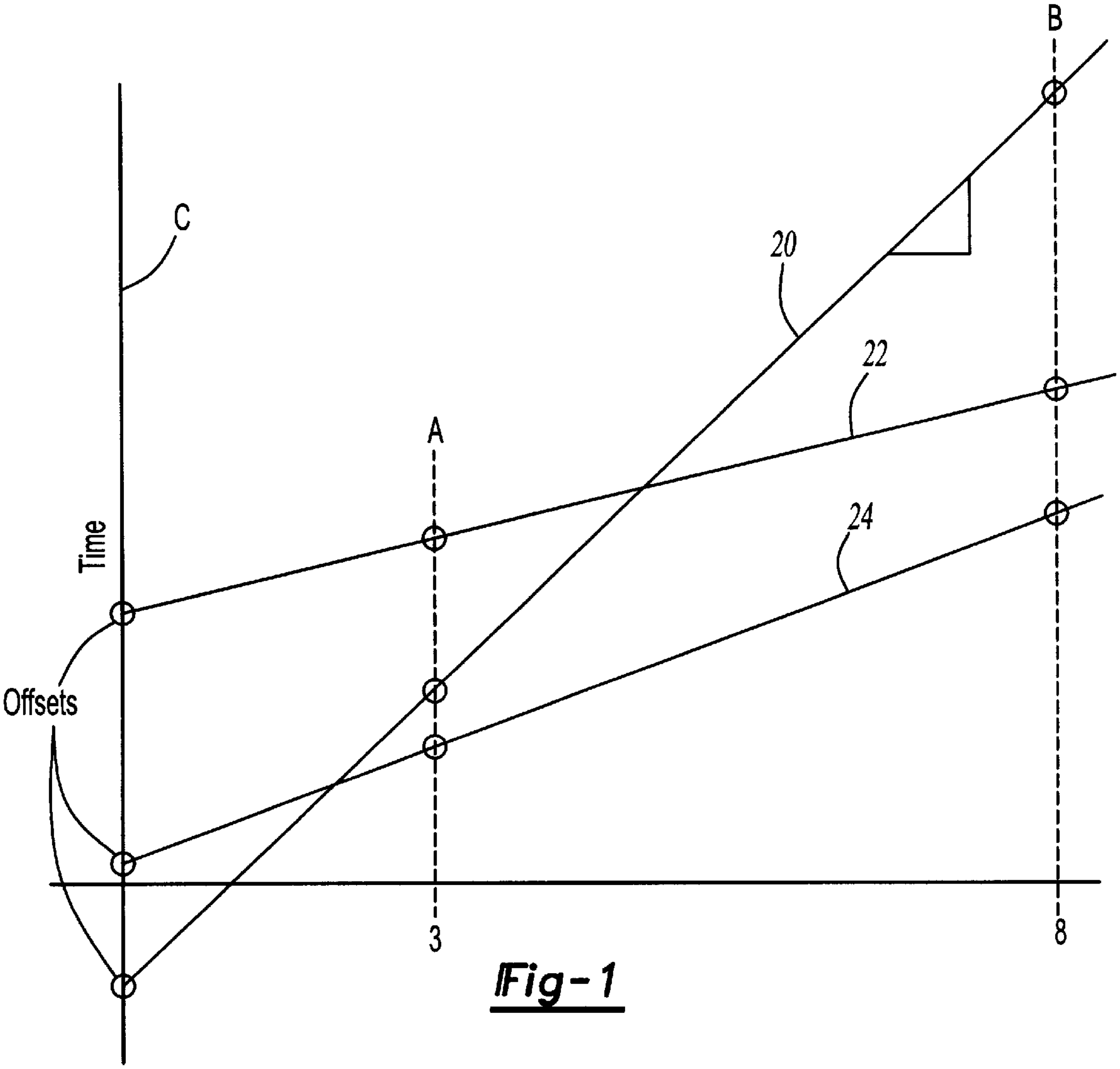
FIG. 1 is a graph of a test result for identifying particular types of fuel injectors.

As shown in FIG. 1, fuel injectors can be characterized by a first quantity called "offset" and a second quantity called "slope". The offset and slope are determined by testing the fuel injector for two qualities. The two qualities are the time it takes to inject three cubic millimeters of fuel, and second the time to inject eight cubic millimeters of fuel. The points identified as "3" and "8" on the graph to FIG. 1 are these "fuel amounts". The amounts of injected fuel would maintain the engine at a low idle. It should be understood that the characterization of an offset and a slope for a fuel injector is prior art, and developed by one of Applicant's customers. This characterization forms no portion of the invention.

As shown for example at line 20, FIG. 1, a particular fuel injector has its first time at an intermediate position and its second time at a relatively high position. The line 20 crosses the axis C at a low point. This would thus be a "low" offset. A fuel injector defined by line 22 crosses the line C at a much higher offset. Notably, the line 22 has a much lower slope than the line 20. The fuel injector defined by line 24 crosses axis C at an intermediate offset position, and further has a slope which is between the slopes of the lines 20 and 22.

Assuming that each injector has high, medium, and low as possible values of slope and high, medium, and low for possible values of offset then the fuel injector characterized by the line 20 could be said to have a low offset and a high slope. The fuel injector characterized by the line 22 could be said to have a high offset, but a low slope. The fuel injector characterized by the line 24 could be said to have a medium offset and a medium slope. Nine distinct combinations of the three values of the two characteristics exist.

Figure 2:
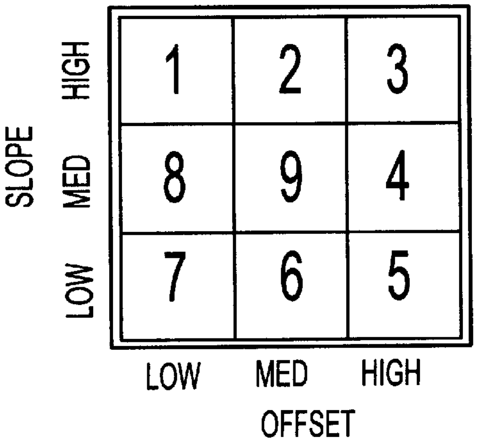
FIG. 2 shows a way of storing information from the test results of FIG. 1.

FIG. 2 shows a way of assigning an incremental value to each of the nine possible combinations of characteristics. As shown, a two-dimensional array is provided which graphs slope between low, medium and high and offset between low, medium and high. Each possible combination of the values is graphically represented by a particular incrementally advancing number. Applicant has found that by storing these numbers in a spiral fashion, the likelihood of a misreading will be reduced. It should be understood that each of the increasing numbers is associated with an increasing voltage (or other electrical characteristic). If the voltage values were assigned increasing in a fashion such that at the end of a row, one moves to the beginning of the row to begin assigning numbers, then a greater misreading could occur than would occur with a spiral array. This is because if the values increase, a misreading of a voltage would most likely occur between two adjacent values. Thus, a misreading between three and eight is unlikely, whereas a misreading between three and four is more likely. With the arrangement as set forth in FIG. 2, a misreading between three and four would still result in the proper offset (high) being determined. Moreover, one would only be off one value in the slope (that is, high has been misread as a medium). On the other hand, if the value four had been assigned to the far middle row, where the number eight is illustrated, that same misreading between three and four would result in both characteristics being off, and one of the characteristics (offset) being off by two values (that is, a high value has been misread as a low value).

By storing and assigning values in a spiral array, the present invention thus provides the benefit of minimizing detrimental effect due to a voltage misreading. While the spiral array is most preferred, simply moving right to left, then left to right and then right to left, or alternatively up, then down, then up would also provide a similar benefit.

While this data storage is an important second feature of this application, the main features of this application go to the identification of a fuel injector type, as will be explained with reference to FIGS. 3–8.

Figure 3:
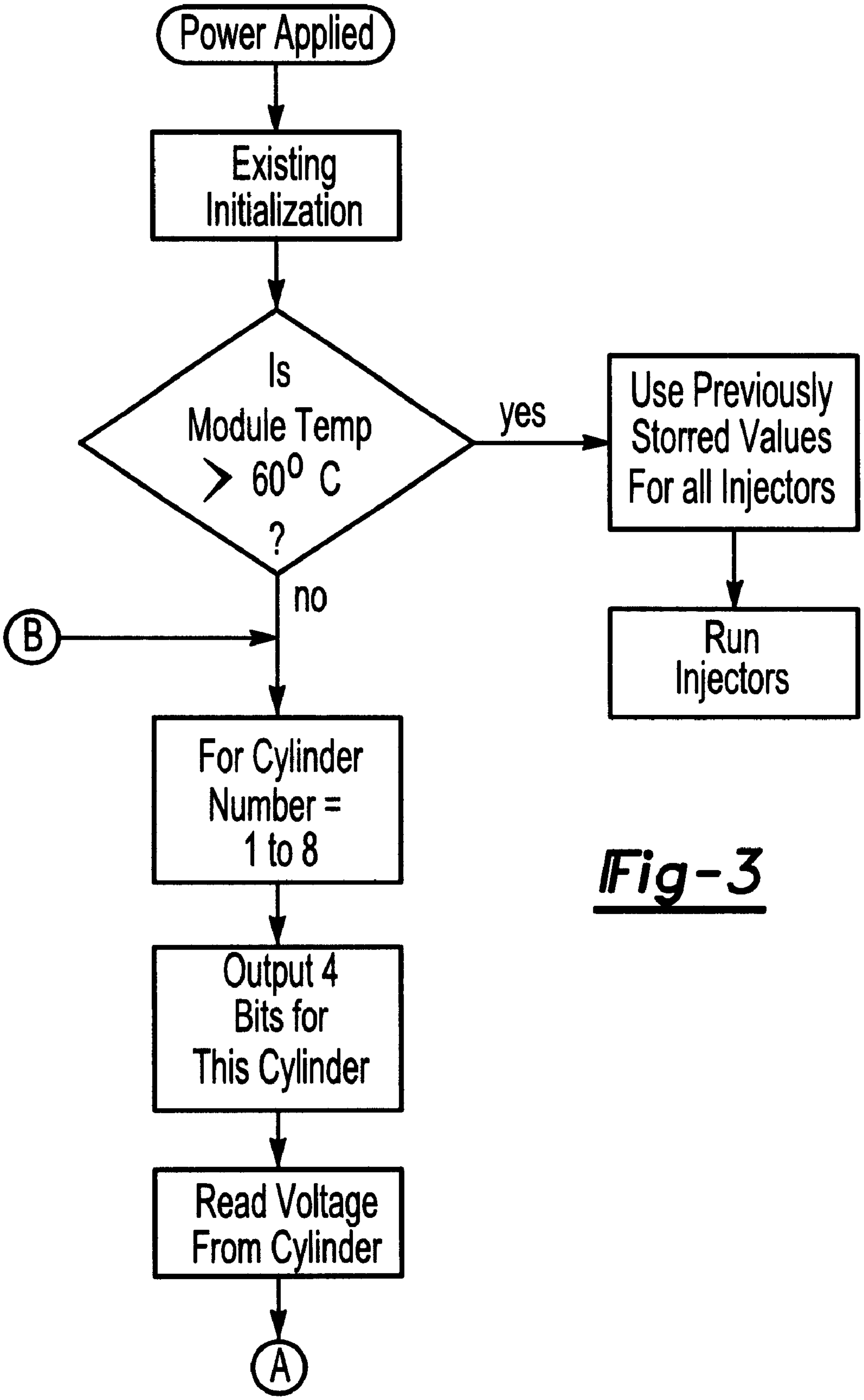
FIG. 3 is a first flow chart of the present invention.

As mentioned above, the present invention incorporates a characterization resistor into each fuel injector once the particular "type" of fuel injector has been determined. The details of this incorporation will be explained below. The basic flow chart and method of this invention can be understood from FIGS. 3 and 4. As shown in FIG. 3, at power up to the control, any existing initialization that may also be included in the control is performed. The fuel injector identification steps then begin. The control first asks if the module or engine temperature is above a predetermined temperature, here sixty degrees centigrade. The reason for this is to determine whether the vehicle has been shut down for a length of time. If the vehicle is above the predetermined temperature, then it can be assumed the vehicle has not been shut down for any length of time. The identification must be repeated each time a fuel injector has been replaced. If the vehicle has not been shut down for a particular length of time, then it is most unlikely that a fuel injector has been replaced. If the temperature is above the predetermined temperature, then the previously stored values for each of the injectors are used for the injectors during engine operation. If the temperature is below the predetermined temperature, then the system moves into the identification loop. Reading the resistor at lower temperature minimizes the effect of FET leakage current, and this additionally improves system accuracy by not reading the characterization resistor value when it is hot and its value has been changed by temperature.

Figure 4:
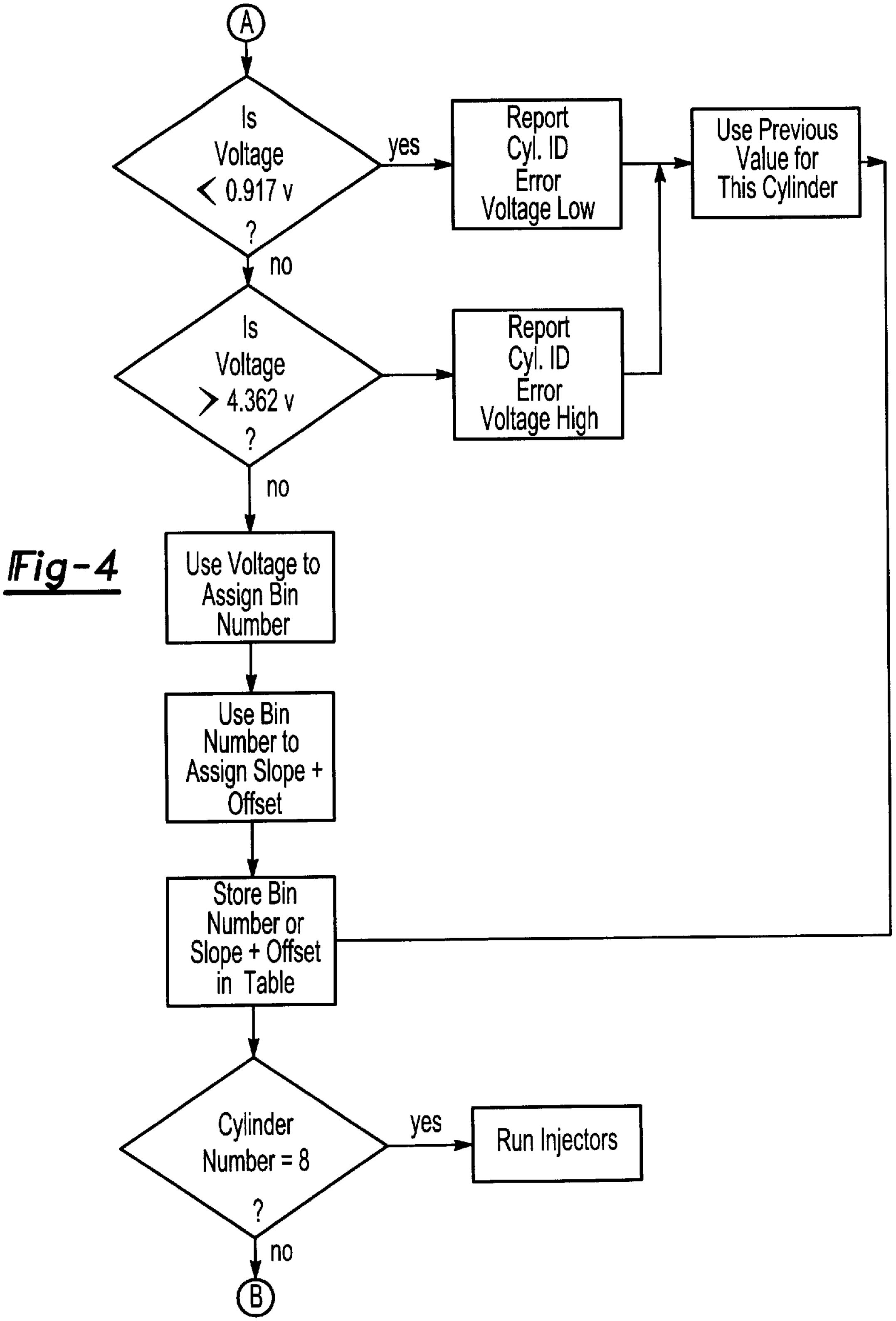
FIG. 4 is a continuation of FIG. 3 flow chart according to the present invention.

An insert B into the FIG. 3 flow chart is shown in FIG. 4, as is output A. For each of the fuel injectors or cylinders, a code is sent which controls an identification circuit to power up one portion of each of the fuel injector circuits and to energize the characterization resistor. The voltage from that fuel injector is then read.

As can be seen in FIG. 4, at step A, the voltage is compared to a minimum and maximum value to determine the validity of the sensed voltage. As an example, if the voltage is lower than a predetermined value, then the system declares an error and uses the previously stored value for that particular fuel injector. If the voltage is above the low predetermined value then the voltage is compared to a high value. Again, if the voltage is above that high value, an error is reported and the previous value is utilized. If an error is reported, the flow chart then goes to incrementally increasing the cylinder number, and asking if the cylinder number is the last (here 8). If the answer is yes, then the control moves to running the injectors. If additional cylinders need to be identified, the system returns to point B in the FIG. 3 flow chart. If the voltage appears to be proper (that is between the high and low values), then the voltage is compared to prestored values to assign a particular fuel injector type to the fuel injector. The assigned type is then used to associate slope and offset. Either the type or the slope and offset are stored at the control for each fuel injector. When the control begins to run the fuel injectors, this information is utilized to optimize the operation of each fuel injector.

Figure 5:
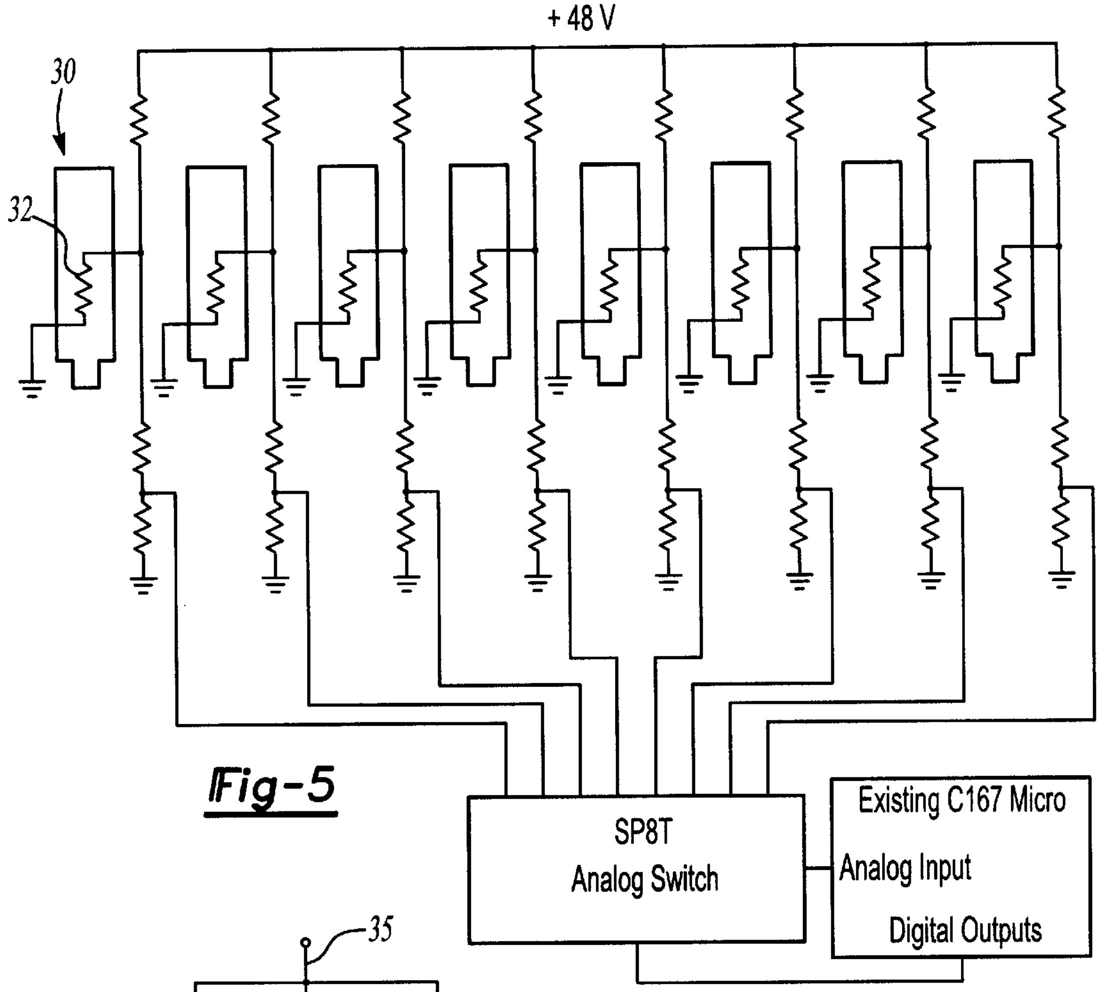
FIG. 5 is a schematic view of an overall diesel engine injector identification circuit.

FIG. 5 shows a partial schematic diagram for the control of the diesel engine and its fuel injectors. Each fuel injector 30 is shown with its characterization resistor 32. As can be seen, each of the injectors have an individual characterization resistor 32. The characterization resistors may be of several types across any one diesel engine, and there may be more than one of any one type. Again, this is determined based upon the characteristics of each fuel injector as manufactured.

Figure 6A:
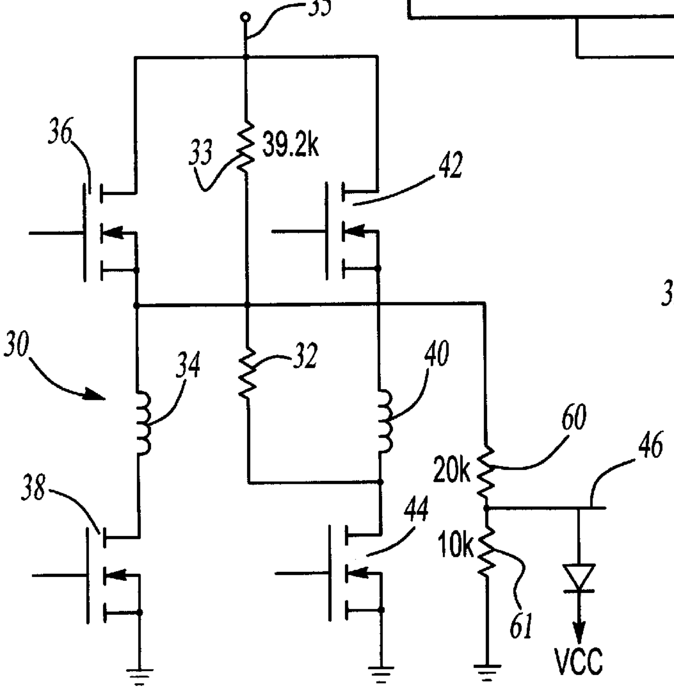
FIG. 6A shows the injector identification circuit associated with one of the fuel injectors.

FIG. 6A shows the circuitry 30 for driving each injector. An important feature of this circuit configuration is that no additional wiring is required within the engine to control module harness.

Each injector has an open 34 and close 40 coil. The open coil 34 causes the injector to open and the close coil 40 causes the injector to close. The open coil 34 is provided with a high driver 36 and a low driver 38. A characterization resistance 32, the only component of this circuit not located in the control module, is placed in series with a resistance 33, which is in turn connected to a power supply 35, which is preferably 48 volts. The close coil 40 is provided with a high side driver 42 and a low side driver 44. The characterization resistor 32 is selected to have such a high resistance that during normal operation very little current will flow through the characterization resistance, and thus the operation of the coil 40 is not affected by the inclusion of the characterization resistor.

The value of the characterization resistor is preferably low enough that the leakage current of the high side driver 36 at the module temperature during the injector identification process is insignificant.

Figure 6B:
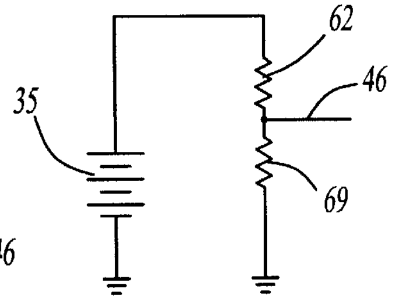
FIG. 6B shows the circuit of FIG. 6A as it would effectively be during an identification mode.

However, the control is provided with the ability to turn on only driver 44 for coil 40 such that the current must flow through the characterization resistor 32. When this occurs, the circuit effectively becomes that which is shown in FIG. 6B. The characterization resistor 32 now controls the voltage leaving the circuit at 46, and being read by the control. In FIG. 6B, a resistance 69 is shown, which is the effective resistance which is varied by the variable characterization resistors 32. As shown in FIG. 6A, resistors 60 and 61 scale the voltage to the output 46, even during normal operation. As shown in FIG. 6B, the resistances 62 and 69 are effectively set by a combination of the resistances including resistor 32. Preferably, the other resistances are selected to be sufficiently high such that differentiations between the individual characterization resistor 32 still can be detected at output 46.

The control thus has the ability to turn on one driver for one coil and read the characterization resistance. Preferably, the low side driver 44 for the close coil 40 is connected such that when it is on and the other drivers are off, the characterization resistance will result in an expected unique range of characterization voltage being readable on the output 46 for each type classification.

Figure 7:
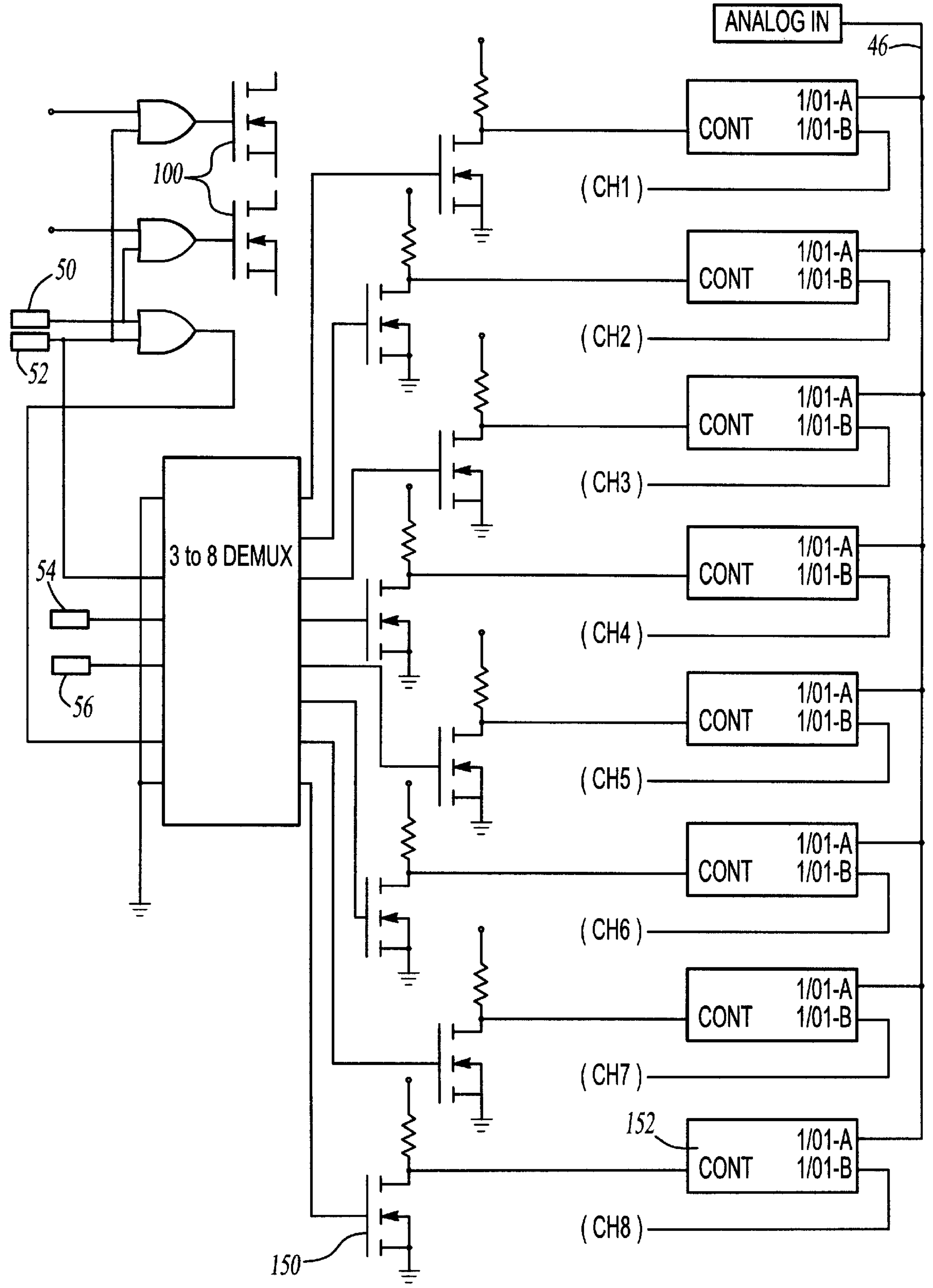
FIG. 7 shows the identification circuitry for the present invention.

FIG. 7 schematically shows the systems for energizing the particular drivers at the particular time. Inputs 50, 52, 54 and 56 selectively drive the particular drivers. The system is shown with only two low side drivers 100 with one being shared by all open and all close coils of all the fuel injectors. In other systems a separate low side driver may be associated with each coil and cylinder. By controlling the inputs 50, 52, 54 and 56, each fuel injector at each cylinder is queried with the proper low side driver powered. A worker in this art would recognize how to provide this function, and the circuit of FIG. 7 is but one example.

Figures 8, 9:
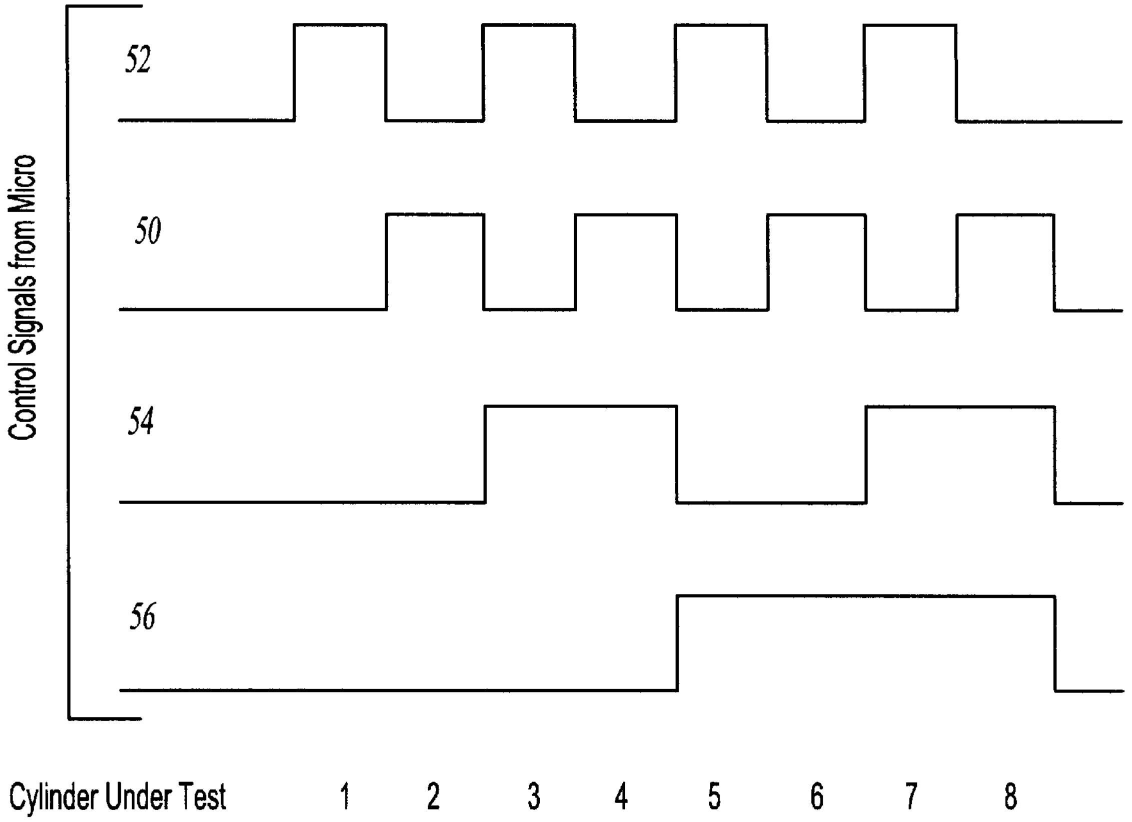
FIG. 8 is a logic state diagram for the fuel injector identification according to this invention.
FIG. 9 is a chart of preferred characterization resistances.

FIG. 8 is a timing diagram showing the inputs to points 50, 52, 54 and 56 to result in control of each of the eight fuel injectors such that each of the injectors is queried in order. The exact details of how the particular cylinder is queried are within the skill of a worker in this art. It is the inclusion of the identification resistance, and the relatively inexpensive and simple result of providing an identification of each fuel injector type which is the main inventive feature here.

Normal signal processing, such as scaling the output of the characterization resistor, and reading through an analog to digital converter are preferably utilized. Preferably, the value of the characterization resistor 32 is chosen to be high (as an example greater than 500 OHMS), such that its effect on normal operation is undetectable. The wetting current for the characterization resistor when its driver is energized is accomplished by the resistor 33 in combination with the other resistors in the circuit, such as is shown in FIG. 6A. The series combination of the resistors 60 and 61 is preferably high enough such that it does not affect the ability to differentiate different values of the characterization resistor 32. The use of the resistors 60 and 61 will ensure that the output 46 going to the multiplexing portion of the control will not be the full 48 volts, even under normal operation. Additionally, the "high" impedance of the resistor combination permits the addition of a simple voltage limiting diode to line 46 assuring that the full 48 V cannot reach the multiplexer even when the injector is miswired. It is desirable for a much lower voltage to be the maximum input to most multiplexers.

The level shifters 150 as shown in FIG. 7 may be eliminated if they are unnecessary to the circuit operation. The elements 152 are a plurality of analogy switches which is associated with each of the individual cylinders.

While the characterization assigning feature of FIG. 2 is shown with regard to two characteristics, each having three potential values, it should be understood that additional characteristics having additional numbers of potential values can also benefit from this invention.

Preferred embodiments of this invention have been disclosed; however, a worker in this art would recognize that modifications come within the scope of this invention. For that reason, the following claims should be studied to determine the true scope and content of this invention.

What is claimed is:

1. A fuel injector system comprising:

a plurality of fuel injectors;

a control for driving said fuel injectors;

an electrical component inserted into each of sad injectors, said electrical component modifying an electrical characteristic sent from said injector to said control and said electrical component being selected to provide an indication of particular characteristics which have been determined to exist for each said fuel injector, said electrical characteristics including a single value which is associated with a code value, said code value being selected to identify values for two distinct ones of said particular characteristics and said control being able to identify said two distinct ones of said particular characteristics by identifying said code value through said electrical characteristic;

said electrical component is a resistor inserted into a circuit for driving said fuel injector, said resistor being selected to provide an identifying code to said control selected to identify characteristics of said fuel injector;

said resistor is incorporated into a circuit associated with one driver for driving a coil for powering said fuel injector.

2. A fuel injection system as recited in claim 1, wherein said characteristics include an offset and slope for the operation of said fuel injector.

3. A fuel injection system as recited in claim 1, wherein said resistor is selected to have a sufficiently high resistance that said resistor blocks flow of current during normal operation of said coil.

4. A fuel injection system as recited in claim 1, wherein said fuel injector having an open coil and a close coil for selectively opening and closing said fuel injector, and each of said coils being provided with a low and high side driver, and said one driver being one of said drivers for one of said coils.

5. A fuel injection system as recited in claim 4, wherein said close coil includes said one driver.

6. A fuel injection system as recited in claim 5, wherein a low side driver for said close coil is said one driver.

7. A fuel injection system as set forth in claim 1, wherein said control determines a system temperature at start-up, and performing an identification query if said system temperature is below a predetermined temperature.

8. A fuel injector system comprising:

a plurality of fuel injectors;

a control for driving said fuel injectors;

an electrical component inserted into each of said injectors, said electrical component modifying an electrical characteristic sent from said injector to said control, and said electrical component being selected to provide an indication of particular characteristics which have been determined to exist for each said fuel injector, said electrical characteristics including a single value which is associated with a code value, said code value being selected to identify values for two distinct ones or said particular characteristics and said control being able to identify said two distinct ones of said particular characteristics by identifying said code value through said electrical characteristic; and said electrical characteristic is assigned with increasing electrical values in such a fashion that each incrementally increasing number changes only one of two characteristics associated with said electrical characteristics.

9. A fuel injection system as set forth in claim 8, wherein said code is associated with a two dimensional array, and said electrical values increases in a spiral fashion in said two-dimensional array.

10. A fuel injection system comprising:

a plurality of fuel injectors, each of said fuel injectors incorporating an open coil and a close coil, said open and close coil being operable to move said injector between open and close positions, and said open and close coils each having a high side and a low side driver; and a characterization resistor associated with at least one driver for one of said coils in each of said fuel injectors, said characterization resistor being selected to provide an electrical output from said fuel injector that provides an identifying code relating to a particular operational characteristic of said fuel injector.

11. A fuel injection system as recited in claim 10, wherein said closed coil and the associated one of said low side drivers are associated with said characterization resistor.

12. A fuel injection system as recited in claim 10, wherein said code is assigned with increasing electrical values in such a fashion that each incrementally increasing number changes only one of two characteristics of said fuel injector.

13. A fuel injection system as recited in claim 12, wherein said two characteristics of said fuel injector include an offset and a slope value.

14. A fuel injection system as recited in claim 10, wherein a control operates to sense said electrical output, identify said identifying code, and associate said identifying code to said particular operational characteristic of said fuel injector, and then control said open and closed coils based upon said particular operational characteristic.

15. A fuel injection system as set forth in claim 14, wherein said particular operational characteristic includes two distinct characteristics of said fuel injector which are identified by said code.

16. A method of operating a fuel injection system comprising the steps of:

(1) testing fuel injectors and determining operational characteristics of each said fuel injector;

(2) providing an electrical component in a circuit for driving said fuel injector, said electrical component having an electrical characteristic which is associated with a particular code stored in a control, said code being associated with particular sets of characteristics relative to said fuel injector;

(3) reading said electrical characteristic from said fuel injector at said control, and associating a particular set of characteristics with said fuel injector once said electrical characteristic has been read by said control; and (4) operating said fuel injector based upon said set of characteristics.

17. A method as set forth in claim 16, wherein said code is assigned with increasing electrical values in such a fashion that each increasing value changes only one of two characteristics.

18. A method as set forth in claim 17, wherein said codes are associated with a two dimensional array, and said values increase in a spiral fashion.

19. A method as set forth in claim 16, wherein a system temperature reading is performed prior to Step (3) and Step (3) is only performed if said system temperature is below a predetermined temperature.

20. A method as set forth in claim 16, wherein if the read electrical characteristic of Step (3) is outside a predetermined envelope, then previously read values are used.

* * * * *